US012248262B2

(12) United States Patent
Hatakeyama et al.

(10) Patent No.: US 12,248,262 B2
(45) Date of Patent: Mar. 11, 2025

(54) FIXING DEVICE AND IMAGE FORMING APPARATUS

(71) Applicant: BROTHER KOGYO KABUSHIKI KAISHA, Nagoya (JP)

(72) Inventors: Shinichi Hatakeyama, Nagoya (JP); Kazuna Taguchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 99 days.

(21) Appl. No.: 18/187,029

(22) Filed: Mar. 21, 2023

(65) Prior Publication Data

US 2023/0314993 A1 Oct. 5, 2023

(30) Foreign Application Priority Data

Mar. 30, 2022 (JP) ................................ 2022-055302

(51) Int. Cl.
*G03G 15/20* (2006.01)
*G03G 15/00* (2006.01)
*G03G 21/16* (2006.01)

(52) U.S. Cl.
CPC ..... *G03G 15/2053* (2013.01); *G03G 15/2064* (2013.01); *G03G 15/757* (2013.01); *G03G 21/1647* (2013.01); *G03G 2215/2032* (2013.01); *G03G 2221/1657* (2013.01)

(58) Field of Classification Search
CPC ........... G03G 15/2053; G03G 15/2064; G03G 15/757; G03G 21/1647; G03G 2215/2032; G03G 2221/1657
See application file for complete search history.

(56) References Cited

U.S. PATENT DOCUMENTS 5,848,331 A * 12/1998 Fromm .............. G03G 15/2064 399/110
7,348,701 B2 * 3/2008 Baek .................. G03G 15/6555 399/167
2004/0200632 A1 * 10/2004 Kanai ................ G03G 21/1619 174/385

(Continued)

FOREIGN PATENT DOCUMENTS

JP 2016-206346 A 12/2016
JP 2017-003618 A 1/2017

(Continued)

*Primary Examiner* — Sevan A Aydin
(74) *Attorney, Agent, or Firm* — Merchant & Gould P.C.

(57) ABSTRACT

A fixing device to be attached to an image forming apparatus includes a heater, a heating rotating body, a pressure rotating body, a frame, and a reinforcement plate. The heating rotating body is heated by the heater. The pressure rotating body forms a nip in combination with the heating rotating body. The frame is made of plastic and configured to support the heating rotating body and the pressure rotating body. The frame has a first end and a second end located apart from each other in a longitudinal direction of the pressure rotating body. The frame includes a side wall located at the first end thereof. The reinforcement plate is made of metal and fixed to the side wall. The reinforcement plate includes a protrusion that protrudes in the longitudinal direction. The protrusion locates the fixing device in place with respect to the image forming apparatus.

12 Claims, 12 Drawing Sheets

(56) References Cited

U.S. PATENT DOCUMENTS

| | | | | |
|---|---|---|---|---|
| 2011/0243611 | A1* | 10/2011 | Kawashima | G03G 15/757 399/167 |
| 2014/0029993 | A1* | 1/2014 | Takagi | G03G 15/2064 399/328 |
| 2014/0119777 | A1* | 5/2014 | Fujimoto | G03G 21/1647 399/167 |
| 2014/0357438 | A1* | 12/2014 | Yamamoto | F16H 7/1281 474/118 |
| 2015/0369338 | A1* | 12/2015 | Sugita | F16H 57/0464 399/167 |
| 2015/0370214 | A1* | 12/2015 | Ishida | G03G 21/1857 399/167 |
| 2015/0370215 | A1* | 12/2015 | Sugita | G03G 21/1857 399/167 |
| 2016/0357132 | A1 | 12/2016 | Hazeyama | |
| 2017/0031303 | A1* | 2/2017 | Tamura | F16H 1/20 |
| 2017/0261909 | A1* | 9/2017 | Yasuda | G03G 21/1647 |
| 2021/0200127 | A1* | 7/2021 | Taguchi | G03G 21/1647 |
| 2021/0311428 | A1* | 10/2021 | Yamaguchi | G03G 15/0178 |
| 2022/0066366 | A1* | 3/2022 | Watanabe | G03G 15/2053 |
| 2022/0299101 | A1* | 9/2022 | Morishita | F16H 57/031 |
| 2024/0231255 | A1* | 7/2024 | Liu | G03G 15/0896 |

FOREIGN PATENT DOCUMENTS

| | | | |
|---|---|---|---|
| JP | 2017-227789 | A | 12/2017 |
| JP | 2021-107863 | A | 7/2021 |

* cited by examiner

FIXING DEVICE AND IMAGE FORMING APPARATUS

REFERENCE TO RELATED APPLICATIONS

This application claims priority from Japanese Patent Application No. 2022-055302 filed on Mar. 30, 2022. The entire content of the priority application is incorporated herein by reference.

BACKGROUND ART

A fixing device known in the art is installed into an image forming apparatus main body of an image forming apparatus. The fixing device comprises a heater, an endless belt, a pressure roller, and a plastic frame. The endless belt is heated by the heater. The pressure roller forms a nip region in combination with the endless belt. The plastic frame supports the pressure roller. An outward-protruding engagement portion is formed on a side wall of the plastic frame. The engagement portion is engaged with an engagement rib provided on the image forming apparatus main body to thereby locate the fixing device in place with respect to the image forming apparatus.

DESCRIPTION

When a portion such as an engagement portion for locating a component in place with respect to an image forming apparatus main body is provided on a plastic frame of a fixing device, it may not be possible to accurately position the fixing device with respect to the image forming apparatus main body when the temperature of the frame rises to a higher temperature due to thermal fixing of a toner image.

It would be desirable to provide a fixing device and an image forming apparatus for accurately locating the fixing device in place with respect to an image forming apparatus main body.

Thus, in one aspect, a fixing device to be attached to an image forming apparatus disclosed herein comprises a heater, a heating rotating body, a pressure rotating body, a frame, and a reinforcement plate. The heating rotating body is to be heated by the heater. The pressure rotating body is configured to form a nip in combination with the heating rotating body. The frame is made of plastic and configured to support the heating rotating body and the pressure rotating body. The frame has a first end and a second end located apart from each other in a longitudinal direction of the pressure rotating body. The frame includes a side wall located at the first end thereof. The reinforcement plate is made of metal and fixed to the side wall. The reinforcement plate includes a protrusion that protrudes in the longitudinal direction. The protrusion is configured to locate the fixing device in place with respect to the image forming apparatus.

According to such configuration, by locating the fixing device in place with respect to the image forming apparatus main body using a protrusion provided on the metal reinforcement plate fixed to the side wall of the frame of the fixing device, the fixing device can be accurately located in place with respect to the image forming apparatus main body even if a temperature of the frame rises to a higher temperature. Further, the plastic frame which is likely caused to rise in temperature can be reinforced by the metal reinforcement plate.

The fixing device may be configured to comprise a first gear arranged outside of the reinforcement plate in the longitudinal direction and attached to one end of the heating rotating body or the pressure rotating body in the longitudinal direction, and a second gear arranged outside of the reinforcement plate in the longitudinal direction and configured to transmit a driving force to the first gear, wherein the second gear is rotatably supported by the protrusion.

According to such configuration, the protrusion can provide functions of locating the fixing device in place and supporting the second gear in a manner that allows the second gear to rotate. Thus, it is possible to accurately locate the fixing device in place with respect to the image forming apparatus main body, and increase stiffness of a supporting shaft of the second gear. Further, the fixing device can be made compact in size.

The second gear may be meshed with the first gear.

According to such configuration, the fixing device can be made compact in size.

The reinforcement plate and the first gear may be disposed with a space provided therebetween in the longitudinal direction.

According to such configuration, since the reinforcement plate and the first gear do not contact each other, abrasion and contact noise can be reduced.

In one example, the heating rotating body is an endless belt that rotates around the heater, and the pressure rotating body is a pressure roller with the first gear attached to the one end of the pressure roller.

The protrusion may be located at a position inside an outline of the heating rotating body as viewed in the longitudinal direction.

According to such configuration, the fixing device can be made compact in size.

The side wall may include a first wall extending in a movement direction perpendicular to the longitudinal direction, a second wall extending in the movement direction and configured to support the heating rotating body or the pressure rotating body in cooperation with the first wall to allow the heating rotating body or the pressure rotating body to move in the movement direction, and a third wall configured to connect one end of the first wall in a direction parallel to the movement direction and one end of the second wall in the direction parallel to the movement direction, with a recess formed by the first wall, the second wall, and the third wall. The recess may open in a direction opposite to the direction parallel to the movement direction. The reinforcement plate may be disposed to extend over the first wall and the second wall and fixed to the first wall and to the second wall.

According to such configuration, a portion of the side wall having a lower strength due to the recess can be effectively reinforced by the metal reinforcement plate.

The reinforcement plate may include a plate body fixed to the side wall, and a metal rod, as the protrusion, fixed to the plate body by staking.

The fixing device may comprise a pressure arm configured to press one of the heating rotating body and the pressure rotating body against the other of the heating rotating body and the pressure rotating body. The frame may include a boss extending in the longitudinal direction and having a hole for fixing the reinforcement plate to the frame by a screw. The pressure arm may be engaged with the boss and rotatably supported by the frame.

According to such configuration, the boss can provide functions of providing a fixing portion for the reinforcement plate and supporting the pressure arm in a rotatable manner. Thus, the fixing device can be made compact in size.

The fixing device may comprise a gear cover attached to the side wall. The gear cover may partially cover outer sides of the first gear and the second gear facing in the longitudinal direction.

In another aspect, an image forming apparatus disclosed herein comprises an image forming apparatus main body and the fixing device described above. The fixing device may be installed into the image forming apparatus main body in a predetermined direction of attachment and attached to the image forming apparatus main body. The image forming apparatus main body may comprise a side frame facing the first end of the fixing device attached to the image forming apparatus main body. The side frame may comprise a groove into which the protrusion is fitted and extending along the direction of attachment with an upstream end of the groove in the direction of attachment being open and a downstream end of the groove in the direction of attachment being closed.

The image forming apparatus main body may comprise a driving gear meshed with the second gear and configured to rotate to bias the protrusion supporting the second gear toward a downstream side of the groove in the direction of attachment.

According to such configuration, since it is possible to bias the protrusion toward the closed end of the groove when the driving gear rotates, the protrusion can be restrained from falling out of the groove and the fixing device can be surely located in place with respect to the image forming apparatus main body.

The groove may be configured in such a manner that the further upstream in the direction of attachment, the wider the width of the groove.

According to such configuration, the protrusion can be easily fitted in the groove when the fixing device is attached to the image forming apparatus main body.

The above and other aspects, their advantages and further features will become more apparent by describing in detail illustrative, non-limiting embodiments thereof with reference to the accompanying drawings briefly described below:

Figure 1:
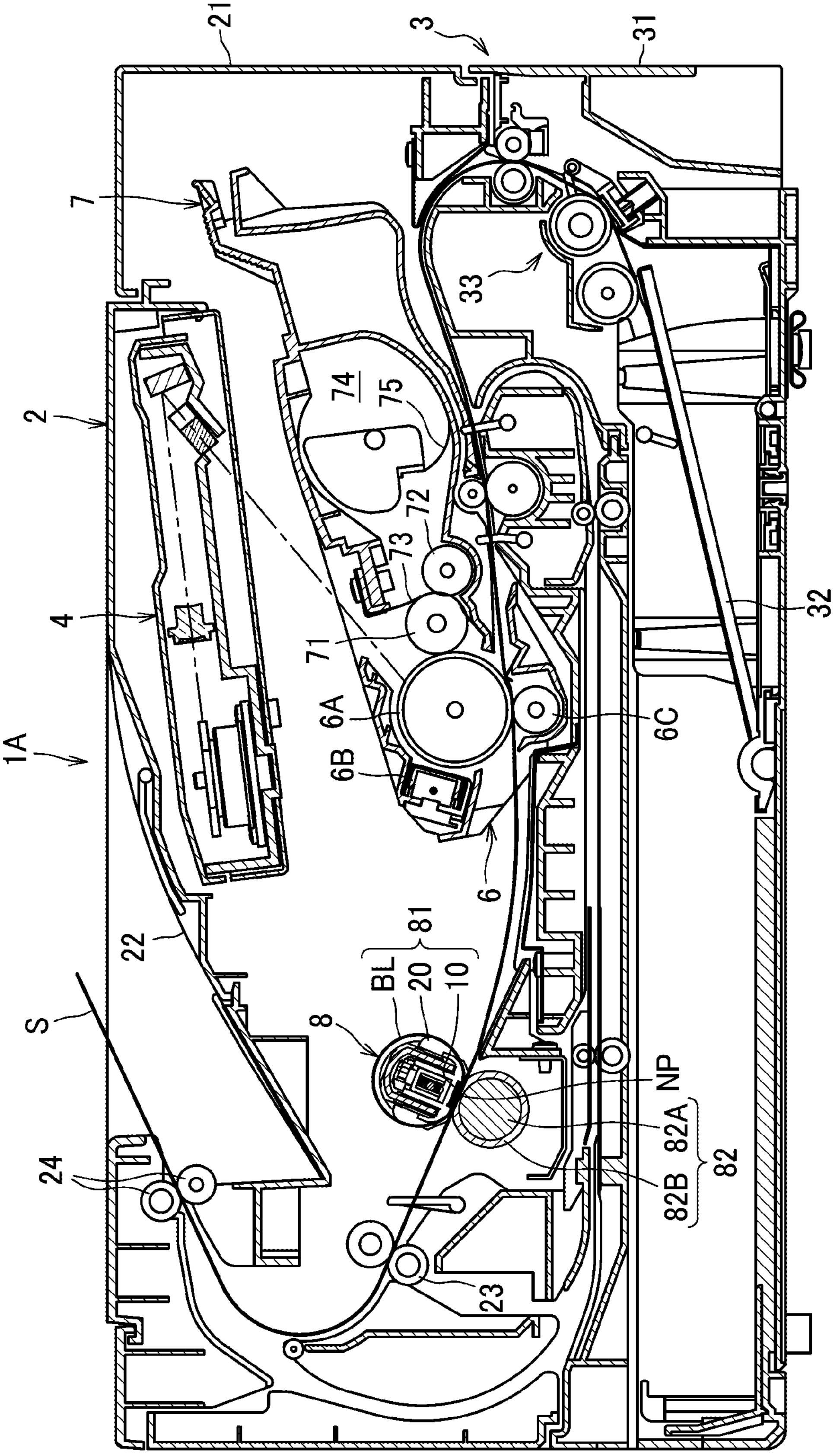
FIG. 1 is an illustration of a schematic structure of an image forming apparatus.

As shown in FIG. 1, one example of an image forming apparatus 1 is a monochrome printer. The image forming apparatus 1 comprises an image forming apparatus main body 1A and a fixing device 8. The image forming apparatus main body 1A comprises a housing 2, a feeder unit 3, and an exposure device 4. A drum cartridge 6 and a development cartridge 7 are installable into and removable from the image forming apparatus main body 1A.

The feeder unit 3 comprises a sheet tray 31, a sheet pressing plate 32 and a sheet feeding mechanism 33. The sheet tray 31 is installable into and removable from the housing 2. The feeder unit 3 causes the sheet pressing plate 32 to press sheets S held in the sheet tray 31 against the sheet feeding mechanism 33, and causes the sheet feeding mechanism 33 to feed the sheets S one by one through between a photosensitive drum 6A and a transfer roller 6C.

The exposure device 4 comprises a light source (not shown), a polygon mirror, lenses, a reflector (shown with reference characters omitted), etc. The exposure device 4 emits a light beam shown by an alternate long and short dashed line onto a surface of the photosensitive drum 6A to thereby expose the surface of the photosensitive drum 6A to light.

The drum cartridge 6 is installable into and removable from the housing 2 through an opening in the housing 2 when a front cover 21 of the housing 2 is opened. The drum cartridge 6 comprises a photosensitive drum 6A, a charger 6B, and a transfer roller 6C.

The development cartridge 7 is installable into and removable from the drum cartridge 6. The development cartridge 7 installed in the drum cartridge 6 is installable into and removable from the housing 2. The development cartridge 7 comprises a development roller 71, a supply roller 72, a doctor blade 73, a container 74 containing toner, and an agitator 75.

The development cartridge 7 supplies toner, contained in the container 74 and agitated by the agitator 75, to the supply roller 72, and then supplies toner from the supply roller 72 to the development roller 71. Toner supplied to the development roller 71 enters the space between the development roller 71 and the doctor blade 73 as the development roller 71 rotates, and is carried on the development roller 71 as a thin layer with a uniform thickness.

The fixing device 8 comprises a heating unit 81 and a pressure roller 82 as an example of a pressure rotating body. The heating unit 81 comprises a heater 10, a holder 20, and a belt BL as an example of a heating rotating body. The heater 10 is a so-called ceramic heater. The belt BL is an endless belt that rotates around the heater 10 and is heated by the heater 10. The holder 20 supports the heater 10 and the belt BL and has a function of guiding the belt BL as the belt BL rotates. The pressure roller 82 comprises a metal shaft 82A and a roller portion 82B. The roller portion 82B is made of rubber or the like and covers a part of the shaft 82A. The pressure roller 82 forms a nip region NP in combination with the belt BL. The nip region NP is formed between the pressure roller 82 and the belt BL.

The image forming apparatus 1 uniformly charges the surface of the photosensitive drum 6A by the charger 6B and thereafter exposes the surface of the photosensitive drum 6A to light by the exposure device 4 to form an electrostatic latent image on the surface of the photosensitive drum 6A based on image data. Toner is then supplied from the development roller 71 to the electrostatic latent image formed on the surface of the photosensitive drum 6A to form a toner image on the surface of the photosensitive drum 6A.

Subsequently, when a sheet S fed from the feeder unit 3 is conveyed through between the photosensitive drum 6A and the transfer roller 6C, the toner image formed on the surface of the photosensitive drum 6A is transferred onto the sheet S. The fixing device 8 conveys the sheet S with the toner image formed thereon through between the heating unit 81 and the pressure roller 82 to thereby thermally fix the toner image on the sheet S. The sheet S with the toner image thermally fixed thereon is ejected onto an output tray 22 by a conveyor roller 23 and an ejection roller 24.

Figure 2:
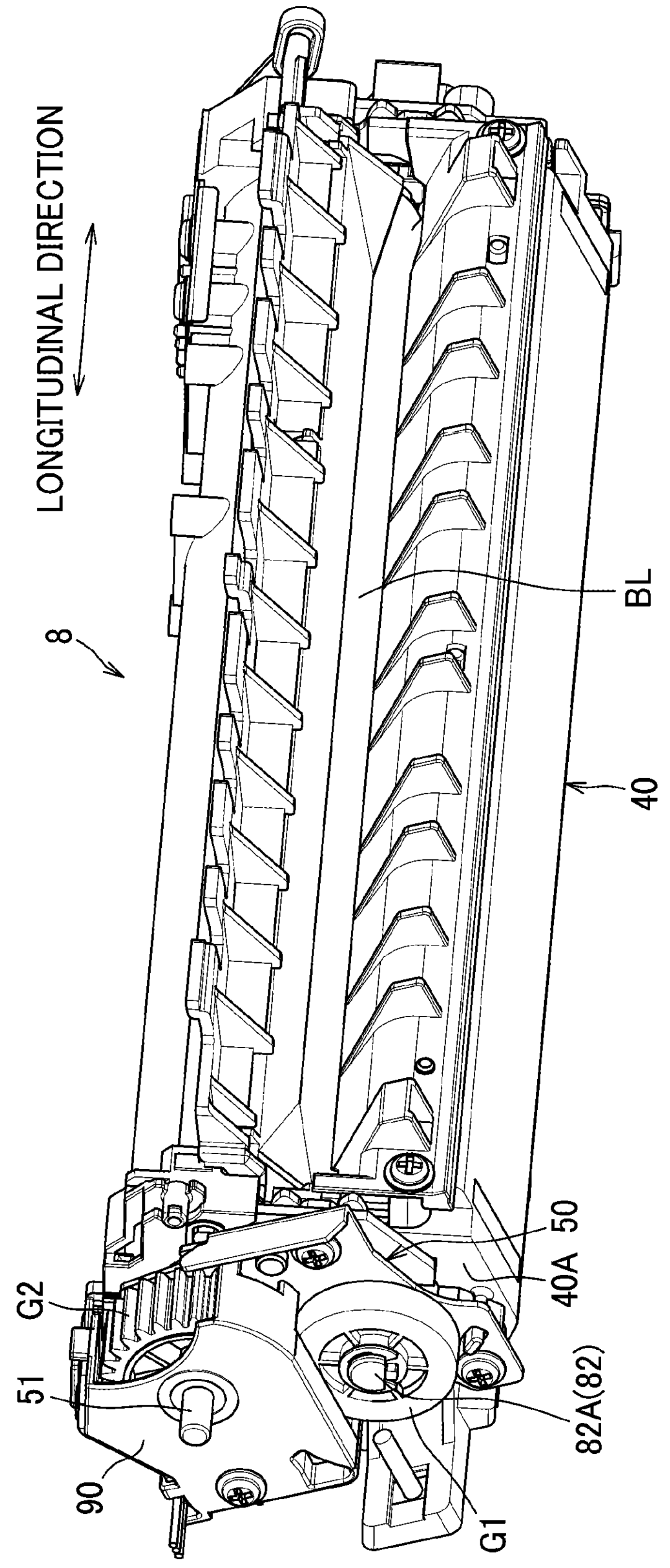
FIG. 2 is a perspective view of a fixing device.
Figure 3:
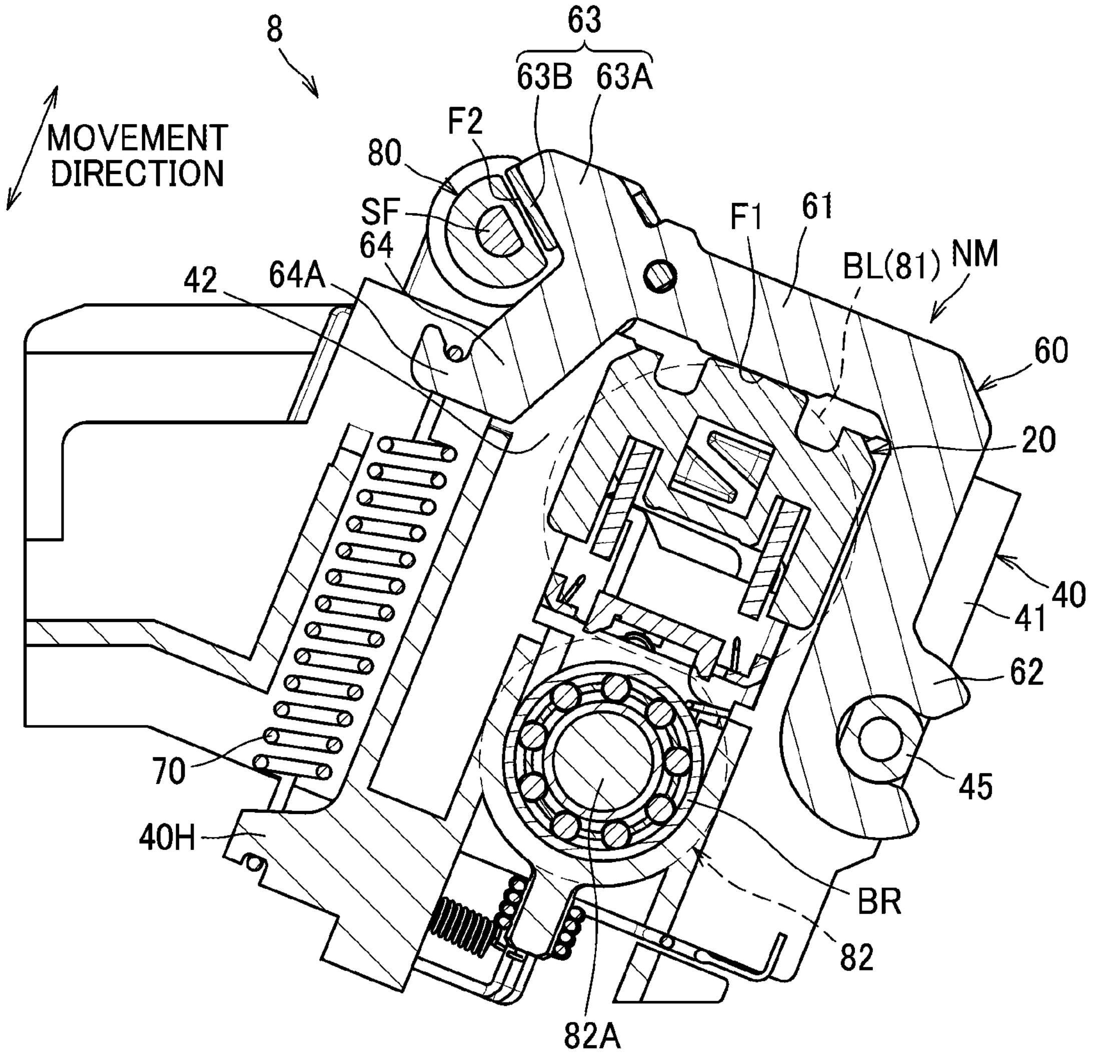
FIG. 3 is a cross-sectional view showing a nip pressure changing mechanism in which a nip pressure between a heating unit and a pressure roller is adjusted to a first nip pressure.
Figure 4:
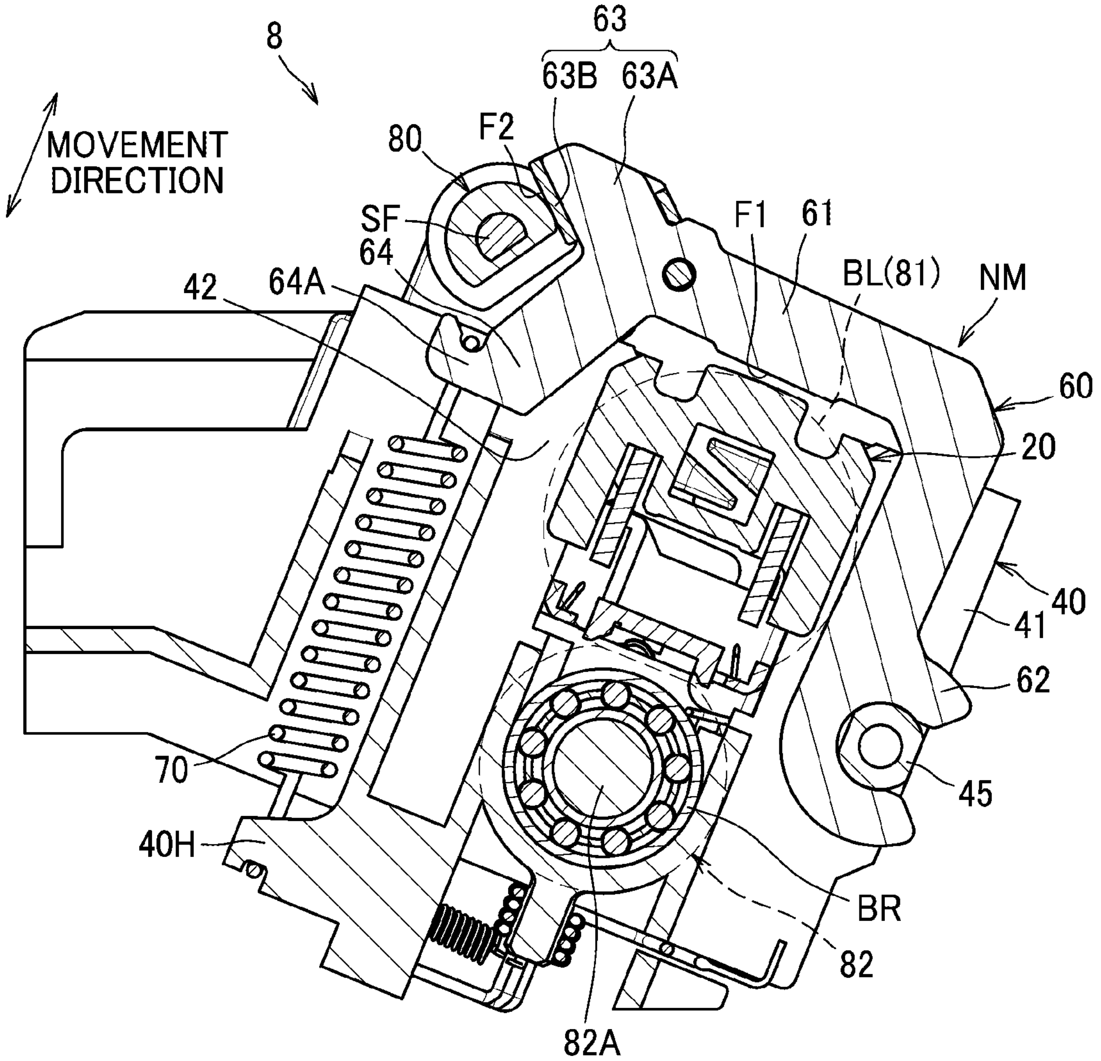
FIG. 4 is a cross-sectional view showing the nip pressure changing mechanism in which the nip pressure is adjusted to a second nip pressure smaller than the first nip pressure.

As shown in FIG. 2, the fixing device 8 comprises a plastic frame 40, a metal reinforcement plate 50, a first gear G1, a second gear G2, and a gear cover 90. As shown in FIGS. 3 and 4, the fixing device 8 comprises a nip pressure changing mechanism NM for changing a nip pressure between the heating unit 81 and the pressure roller 82.

The frame 40 supports the belt BL and the pressure roller 82. Specifically, the frame 40 supports the belt BL via the holder 20 and supports the pressure roller 82 via bearings BR in a manner that allows the pressure roller 82 to rotate. Further, the frame 40 supports the heating unit 81 in such a manner as to allow the heating unit 81 to move in directions parallel to a predetermined movement direction. Specifically, the frame 40 supports the heater 10 and the belt BL via the holder 20 to allow the heater 10 and the belt BL to move in the directions parallel to the movement direction.

The movement direction of the heating unit 81 (i.e., the heater 10, holder 20, and the belt BL) is a direction perpendicular to a longitudinal direction of the pressure roller 82. In the following description, the movement direction of the heating unit 81 is also referred to simply as "movement direction" and the longitudinal direction of the pressure roller 82 is also referred to simply as "longitudinal direction". The fixing device 8 has a first end and a second end located apart from each other in the longitudinal direction. The shaft 82A of the pressure roller 82 has a first end and a second end corresponding to the first end and the second end, respectively, of the fixing device 8, and located apart from each other in the longitudinal direction. The frame 40 has a first end and a second end corresponding to the first end and the second end, respectively, of the fixing device 8, and located apart from each other in the longitudinal direction. The holder 20 has a first end and a second end corresponding to the first end and the second end, respectively, of the fixing device 8, and located apart from each other in the longitudinal direction.

Figure 5A:
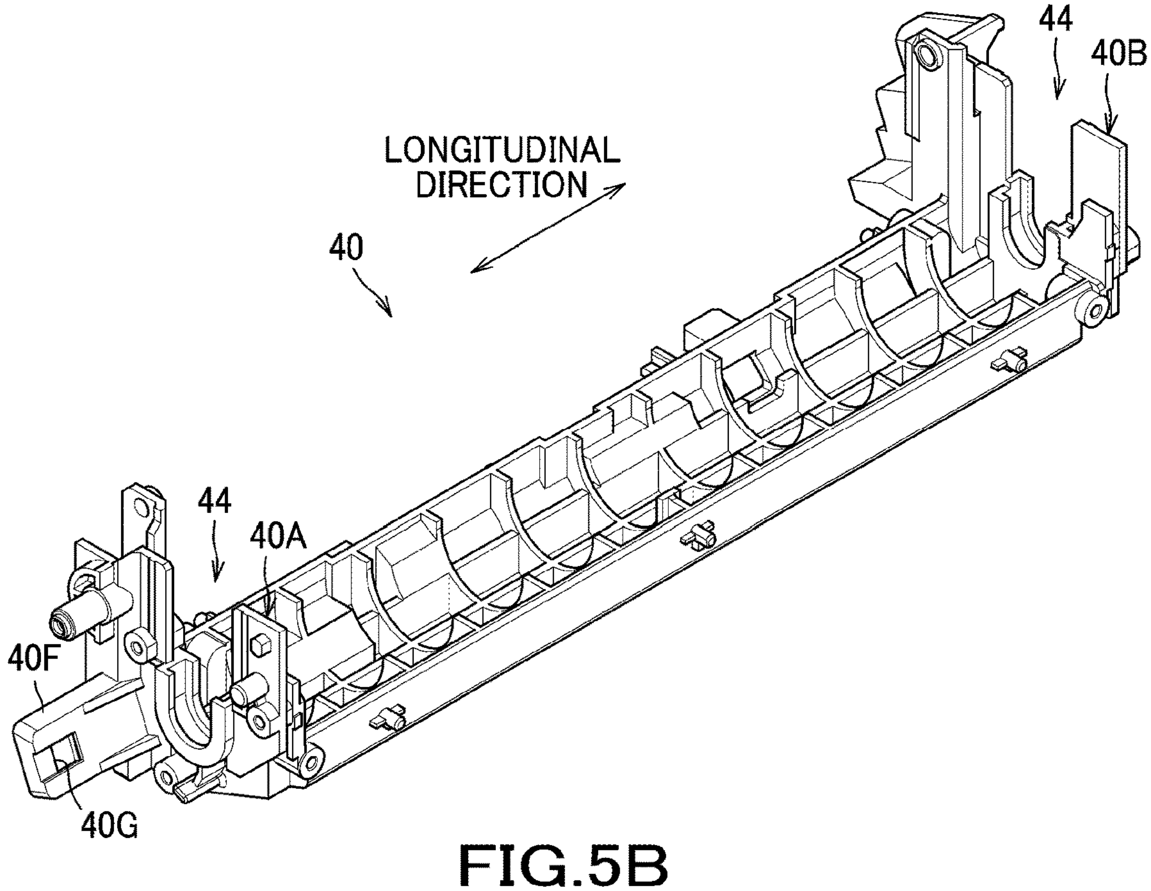
FIG. 5A is a perspective view of a frame.
Figure 5B:
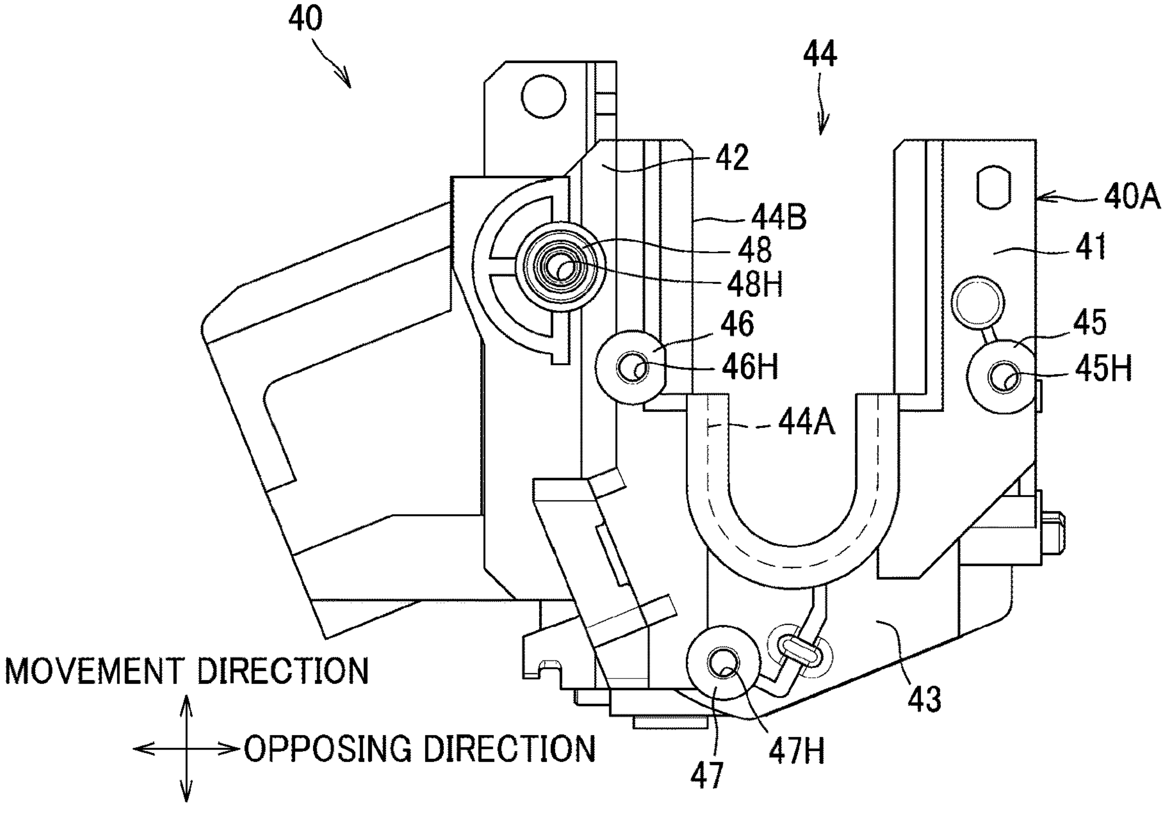
FIG. 5B is a side view of the frame.
Figure 6:
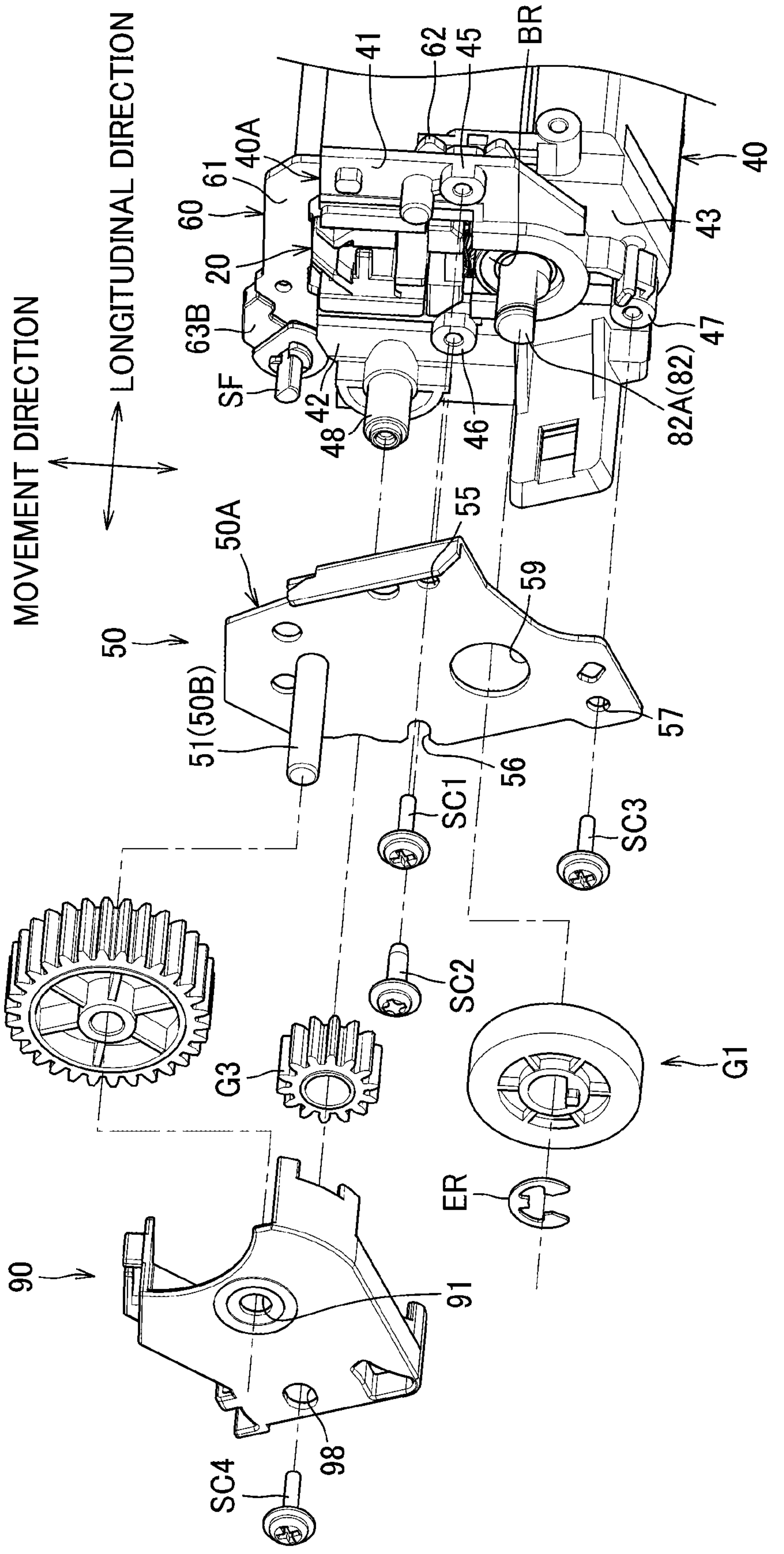
FIG. 6 is a perspective view of an end of the frame, a reinforcement plate, a first gear, a second gear, a gear cover, and other components.

As shown in FIG. 5A, the frame 40 includes a first side wall 40A located at the first end of the frame 40, and a second side wall 40B located at the second end of the frame 40. The first side wall 40A is an example of a side wall. As shown in FIGS. 5B and 6, the first side wall 40A includes a first wall 41, a second wall 42, a third wall 43, and a recess 44.

The first wall 41 and the second wall 42 are located apart from each other in an opposing direction perpendicular to the movement direction and extend in the movement direction. The second wall 42 holds the first end of the holder 20 in combination with the first wall 41. The first end of the holder 20 is held between the first wall 41 and the second wall 42. The holder 20 is movably supported by the first wall 41 and the second wall 42, and the belt BL supported by the holder 20 is in turn rendered movable in directions parallel to the movement direction. The third wall 43 connects an end of the first wall 41 and an end of the second wall 42 which are located at the same side of the frame 40 in one of the directions parallel to the movement direction.

The recess 44 is formed by the first wall 41, the second wall 42, and the third wall 43. The recess 44 opens on a side of the frame 40 opposite to the side on which the third wall 43 is located in the movement direction. The recess 44 includes a roller supporting portion 44A and a rail portion 44B. The roller supporting portion 44A supports the first end of the shaft 82A of the pressure roller 82 via one of the bearings BR. The rail portion 44B supports the first end of the holder 20 in such a manner as to allow the first end to move in the directions parallel to the movement direction.

The rail portion 44B is located in a position farther, than the roller supporting portion 44A, from the third wall 43 in a direction parallel to the movement direction. The direction in which the first wall 41 and the second wall 42 are opposed to each other is a direction perpendicular to the movement direction and to the longitudinal direction. In the following description, the direction in which the first wall 41 and the second wall 42 are opposed to each other is also referred to as "opposing direction".

The frame 40 includes a first boss 45 as an example of a boss, a second boss 46, a third boss 47, and a fourth boss 48. The first boss 45, the second boss 46, the third boss 47, and the fourth boss 48 extend in the longitudinal direction.

The first boss 45 is located near a midsection of the first wall 41 in the movement direction. The second boss 46 is located in a position opposed to the first boss 45 in the opposing direction, near a midsection of the second wall 42 in the movement direction. The third boss 47 is provided on the third wall 43. The third boss 47 is located between the first boss 45 and the second boss 46 in the opposing direction. In other words, a plane perpendicular to the opposing direction and intersecting the third boss 47 is located between the first boss 45 and the second boss 46. The first boss 45, the second boss 46, and the third boss 47 respectively have holes 45H, 46H, 47H to which corresponding screws SC1, SC2, SC3 are fastened to fix the reinforcement plate 50 to the frame 40.

The fourth boss 48 is provided on the second wall 42. The fourth boss 48 is located on a side of the second boss 46 opposite to a side on which the first boss 45 is located, in the opposing direction. The fourth boss 48 has a hole 48H to which a screw SC4 is fastened to fix the gear cover 90 to the frame 40. The fourth boss 48 extends further outward in the longitudinal direction than the first boss 45, the second boss 46, and the third boss 47.

As shown in FIG. 5A, the second side wall 40B includes a recess 44 configured similar to the recess 44 of the first side wall 40A. The recess 44 of the second side wall 40B supports the second end of the shaft 82A of the pressure roller 82 via the other of the bearings (not shown), and supports the second end of the holder 20 in such a manner as to allow the second end to move in the directions parallel to the movement direction. The heating unit 81 comprising the belt BL is supported movably in the directions parallel to the movement direction by the first side wall 40A and the second side wall 40B.

As shown in FIG. 3, the nip pressure changing mechanism NM comprises a pair of pressure arms 60, a pair of pressure springs 70, and a pair of cams 80. One of the pressure arms 60, one of the pressure springs 70, and one of the cams 80 are located at the first end of the frame 40. The other of the pressure arms 60, the other of the pressure springs 70, and the other of the cams 80 are located at the second end of the frame 40. In the following description, the nip pressure changing mechanism NM will be described referring to the pressure arm 60, the pressure spring 70, and the cam 80 located at the first end of the frame 40.

The pressure arm 60 presses one of the belt BL and the pressure roller 82 against the other of the belt BL and the pressure roller 82. In this example, the pressure arm 60 pushes the holder 20 toward the pressure roller 82 and thereby presses the belt BL supported by the holder 20 against the pressure roller 82. The pressure arm 60 comprises a body portion 61, a supported portion 62, a first end portion 63, and a second end portion 64.

The body portion 61 has a pressure surface F1 for pushing the holder 20 toward the pressure roller 82.

The supported portion 62 is rotatably supported by the frame 40. The pressure arm 60 located at the first end of the frame 40 is configured such that the supported portion 62 thereof is engaged with the first boss 45 and is rotatably supported by the frame 40. The supported portion 62 has a shape that approximates the letter C as viewed from the longitudinal direction. The first boss 45 is positioned inside the C-shaped portion of the supported portion 62, so that the supported portion 62 is engaged with the first boss 45.

The first end portion 63 includes a base 63A made of metal and a cam follower 63B made of plastic. The body portion 61, the supported portion 62, the base 63A, and the second end portion 64 are made of metal and are integrally formed in one piece. The cam follower 63B is fitted onto the base 63A and has a to-be-pushed surface F2 to be pushed by the cam 80.

The second end portion 64 extends from an end of the body portion 61 in a direction different from a direction in which the first end portion 63 extends. The second end portion 64 includes a spring hook 64A on which one end of the pressure spring 70 is hooked.

The pressure spring 70 is a tension coil spring that biases the pressure arm 60 toward the pressure roller 82. The frame 40 includes a spring hook 40H on which the other end of the pressure spring 70 is hooked, i.e., one end of the pressure spring 70 is hooked on the spring hook 64A of the pressure arm 60, and the other end of the pressure spring 70 is hooked on the spring hook 40H.

The cam 80 is rotatably supported by the frame 40 and can push the pressure arm 60 against the biasing force of the pressure spring 70. The cam 80 is rotatable between a first position shown in FIG. 3 and a second position shown in FIG. 4. The cam 80 located at the first end of the frame 40 and the cam 80 (not shown) located at the second end of the frame 40 are fixed to opposite ends of a metal shaft SF and rotate together as a single member.

As shown in FIG. 3, when the cam 80 is located in the first position, the nip pressure is adjusted to a first nip pressure. At this time, the pressure surface F1 of the body portion 61 is in contact with the holder 20 and pushes the holder 20 toward the pressure roller 82. As shown in FIG. 4, when the cam 80 is located in the second position, the nip pressure is adjusted to a second nip pressure smaller than the first nip pressure. At this time, the pressure surface F1 of the body portion 61 is located apart from the holder 20.

As shown in FIG. 6, the reinforcement plate 50 is fixed to the first side wall 40A. The reinforcement plate 50 includes a protrusion 51 for locating the fixing device 8 in place with respect to the image forming apparatus main body 1A. The protrusion 51 has a cylindrical shape and protrudes toward an outside of the frame 40 in the longitudinal direction. The reinforcement plate 50 includes a plate body 50A and a metal rod 50B.

The plate body 50A is formed of a metal sheet and is fixed to the first side wall 40A.

Figure 7A:
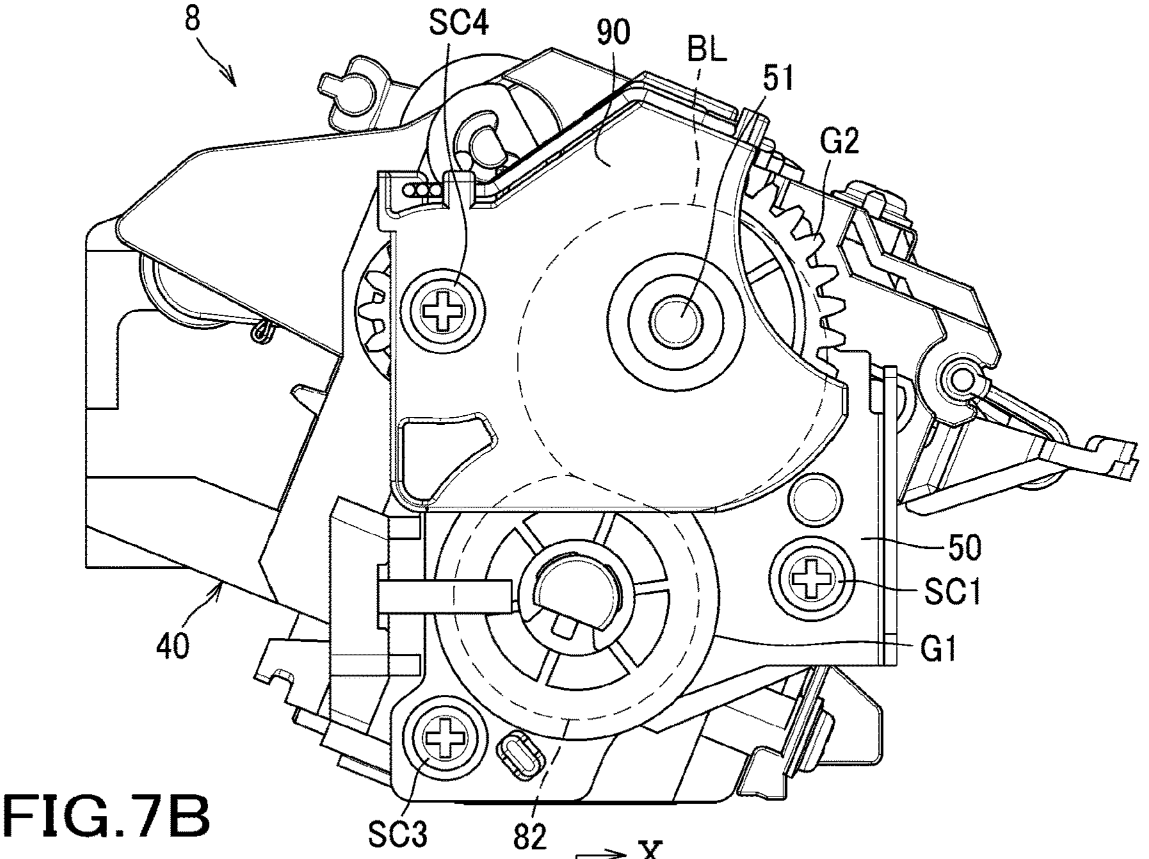
FIG. 7A is a side view of the fixing device.

The metal rod 50B is a member that forms the protrusion 51. The metal rod 50B is fixed to the plate body 50A with an end of the metal rod 50B, closer to the first side wall 40A in the longitudinal direction, joined to the plate body 50A by staking. As shown in FIG. 7A, the protrusion 51 is located at a position inside the outline of the belt BL as viewed in the longitudinal direction.

Figure 7B:
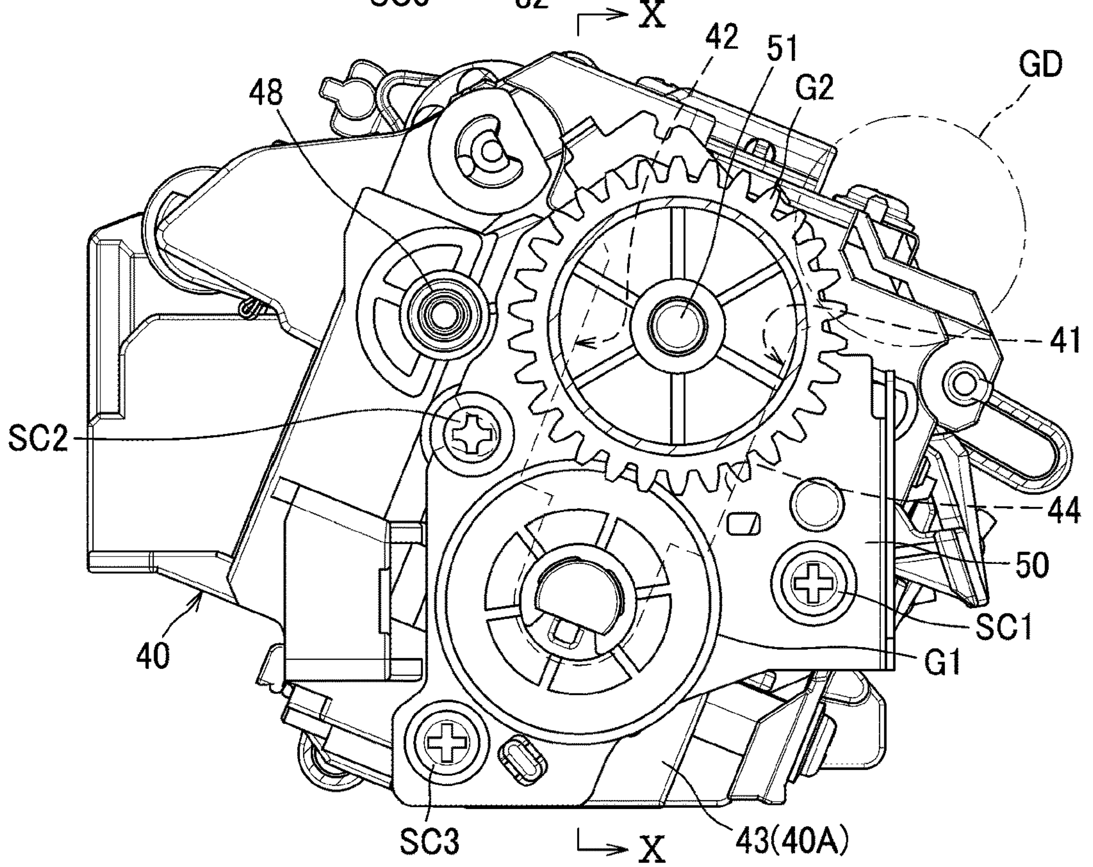
FIG. 7B is a side view of the fixing device with the gear cover removed.

As shown in FIG. 7B, the reinforcement plate 50 is disposed to extend over the first wall 41 and the second wall 42, and arranged outside of the first side wall 40A in the longitudinal direction (the direction in which the protrusion 51 protrudes). More specifically, the reinforcement plate 50 covers the recess 44 and overlaps a part of the first wall 41, a part of the second wall 42, and a part of the third wall 43, as viewed from the longitudinal direction.

The reinforcement plate 50 is fixed to the first wall 41, the second wall 42, and the third wall 43. Specifically, as shown in FIG. 6, the plate body 50A of the reinforcement plate 50 has a hole 55 corresponding to the first boss 45, a slot 56 corresponding to the second boss 46, and a hole 57 corresponding to the third boss 47. The reinforcement plate 50 is fixed to the first wall 41 by inserting a screw SC1 through the hole 55 and fastening the screw SC1 to the first boss 45. The reinforcement plate 50 is fixed to the second wall 42 by inserting a screw SC2 through the slot 56 and fastening the screw SC1 to the first boss 46. The reinforcement plate 50 is thereby fixed to the first wall 41 and the second wall 42, on both sides of the recess 44 (see FIG. 7B) in the opposing direction. Further, the reinforcement plate 50 is fixed to the third wall 43 by inserting a screw SC3 through the hole 57 and fastening the screw SC3 to the third boss 47.

Figure 8:
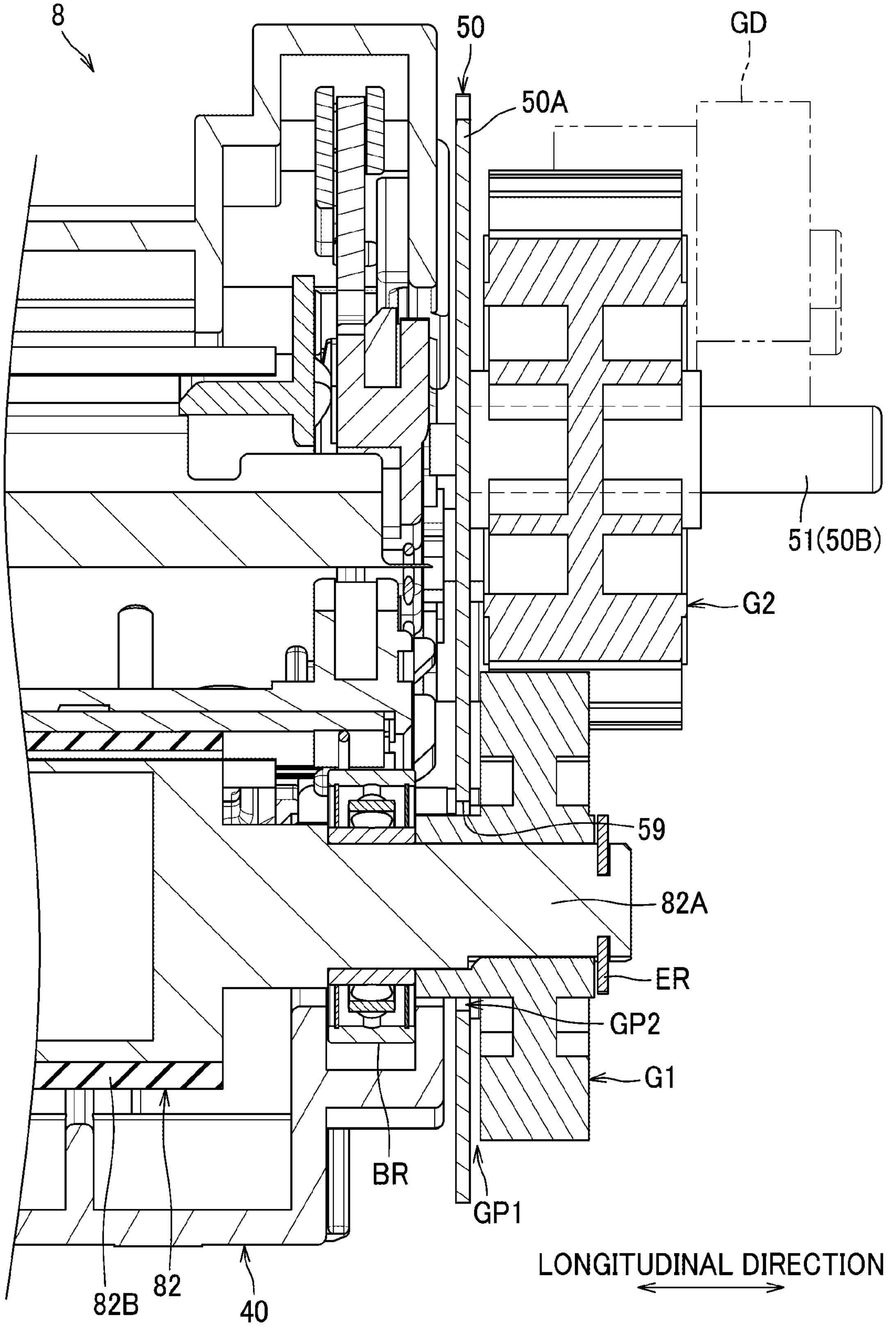
FIG. 8 is a partial cross-sectional view along line X-X of FIG. 7B.

The first gear G1 is a gear attached to one end of the pressure roller 82 in the longitudinal direction (the direction in which the protrusion 51 protrudes) and rotates together with the pressure roller 82. Specifically, the first gear G1 is engaged with the first end of the shaft 82A of the pressure roller 82 and is retained on the shaft 82A by an E-ring ER so that the first gear G1 does not come off the shaft 82A. The first gear G1 is surrounded by the first boss 45, the second boss 46, and the third boss 47 as viewed from the longitudinal direction. As shown in FIG. 8, the first gear G1 is arranged outside of the reinforcement plate 50 in the longitudinal direction (the direction in which the protrusion 51 protrudes). The plate body 50A of the reinforcement plate 50 and the first gear G1 are disposed in such a manner that a space GP1 is provided therebetween in the longitudinal direction.

The plate body 50A has a hole 59 through which the first end of the shaft 82A of the pressure roller 82 and a part of the first gear G1 passes. The inner surface of the hole 59 and the first gear G1 are located apart from each other in the radial direction of the shaft 82A by a space GP2. That is, the plate body 50A of the reinforcement plate 50 and the first gear G1 are disposed in such a manner that they do not contact each other.

As shown in FIG. 7B, the second gear G2 is a gear that transfers a driving force to the first gear G1. The second gear G2 is meshed with a driving gear GD provided at the image forming apparatus main body 1A when the fixing device 8 is attached to the image forming apparatus main body 1A. The second gear G2 inputs the driving force received from the driving gear GD to the first gear G1. The second gear G2 is located on the same side of the reinforcement plate as the side on which the first gear G1 is located. That is, the second gear G2 is arranged outside of the reinforcement plate 50 in the longitudinal direction (the direction in which the protrusion 51 protrudes). The second gear G2 is meshed with the first gear G1. The second gear G2 is engaged with the protrusion 51 of the reinforcement plate 50 and is rotatably supported by the protrusion 51. That is, the protrusion 51 supports the second gear G2 in a manner that allows the second gear G2 to rotate.

As shown in FIG. 6, the fixing device 8 further comprises a third gear G3. The image forming apparatus 1 comprises an intermediate ejection roller (not shown) that conveys a sheet S ejected from between the heating unit 81 and the pressure roller 82 toward the conveyor roller 23 (see FIG. 1). The third gear G3 is a gear for transferring a driving force to the intermediate ejection roller. The third gear G3 is meshed with the second gear G2. The third gear G3 is engaged with the fourth boss 48 and is rotatably supported by the fourth boss 48.

The gear cover 90 is a member that at least partially covers outer sides of the gears G1 to G3 facing in the longitudinal direction (the direction in which the protrusion 51 protrudes). The gear cover 90 has holes 91, 98. The protrusion 51 of the reinforcement plate 50 passes through the hole 91. An end of the forth boss 48 provided on the first side wall 40A is engaged with the hole 98. The gear cover 90 is fixed to the first side wall 40A by fastening a screw SC4 to the forth boss 48.

Figure 9:
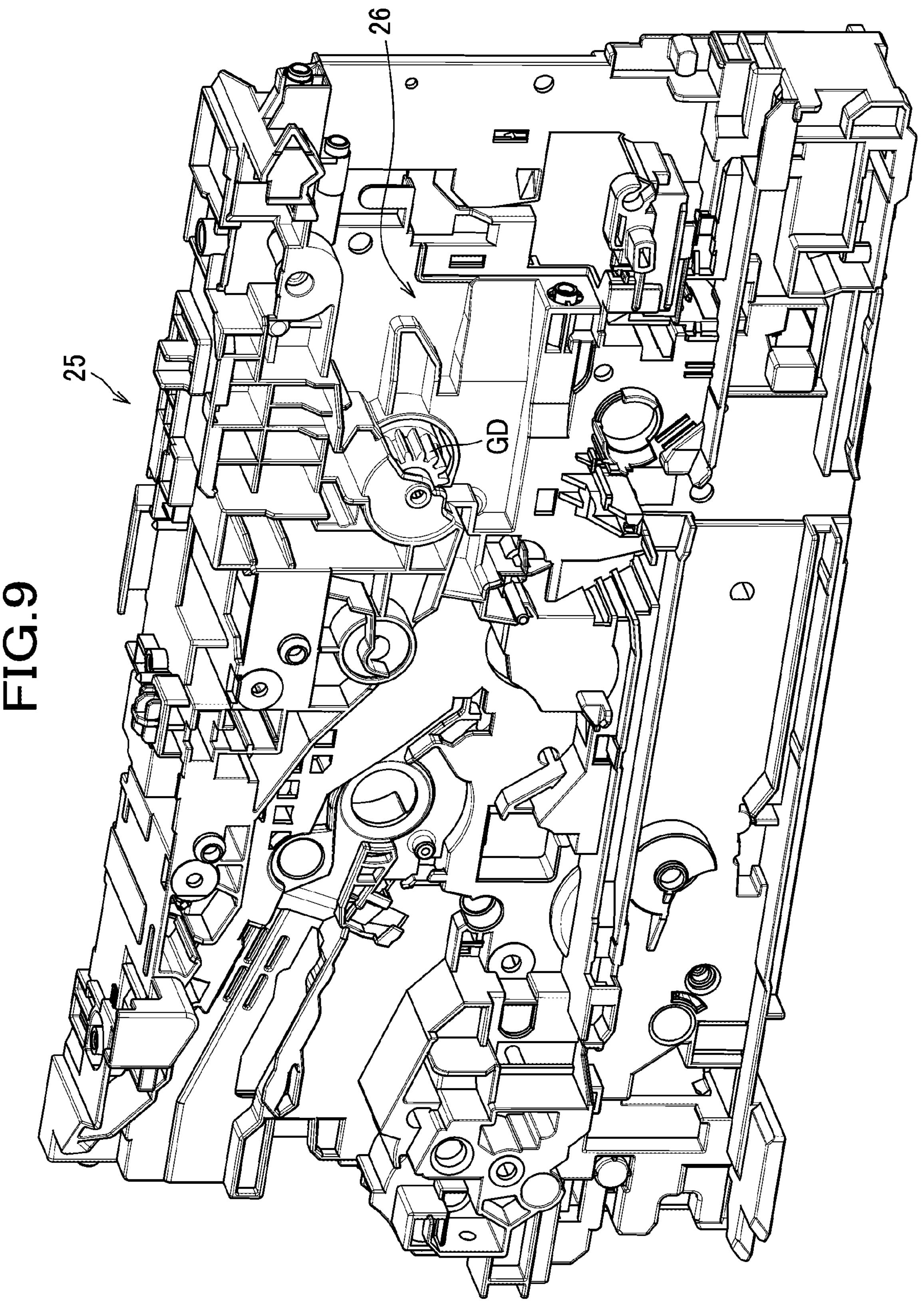
FIG. 9 is a perspective view showing a side frame of an image forming apparatus main body.

As shown in FIG. 9, the image forming apparatus main body 1A comprises a side frame 25 and a driving gear GD.

The side frame 25 is one of the members that form the housing 2 of the image forming apparatus main body 1A. The side frame 25 is a part of the housing 2 located on one side of the image forming apparatus main body 1A, which faces the first end of the fixing device 8 attached to the image forming apparatus main body 1A. The first end of the fixing device 8 is fixed to the side frame 25.

Figure 10:
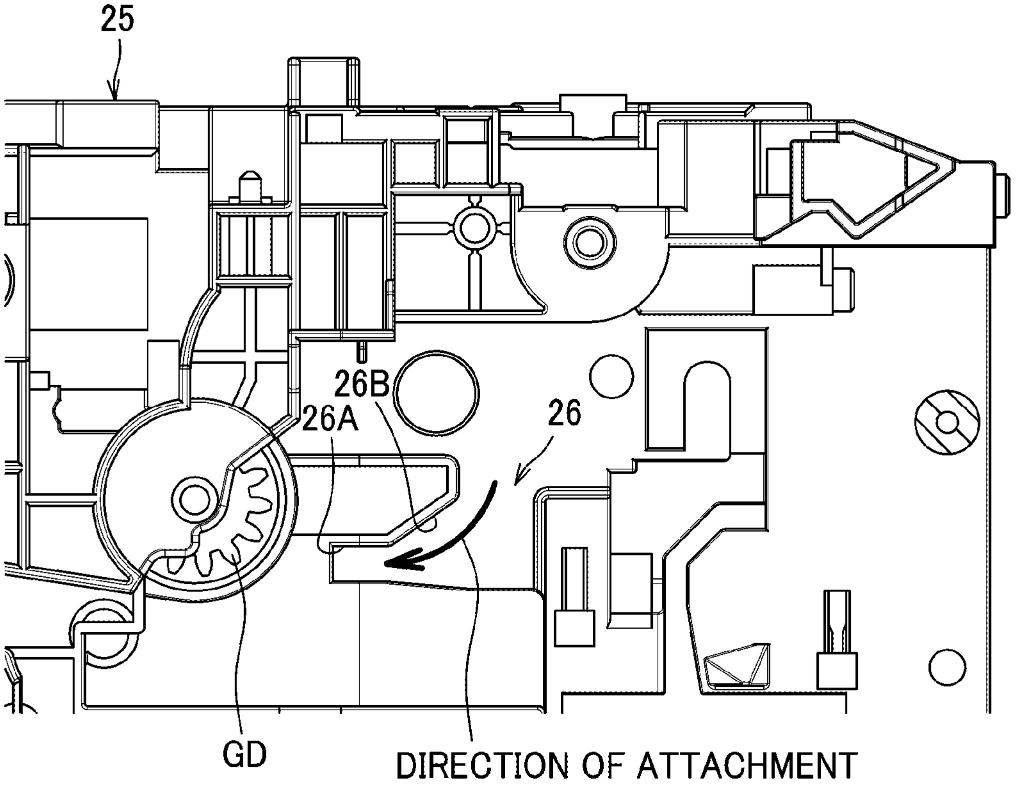
FIG. 10 is an enlarged side view of an area of the side frame in the vicinity of a groove.

The side frame 25 includes a groove 26 into which the protrusion 51 of the fixing device 8 is fitted. As shown in FIG. 10, the fixing device 8 is installed in a predetermined direction of attachment and attached to the image forming apparatus main body 1A. The groove 26 extends along the direction of attachment. The groove 26 opens toward the fixing device 8 positioned on the inner side of the side frame 25 facing in a direction opposite to the direction in which the projection 51 protrudes. The groove 26 has a shape with an upstream side open and a downstream side closed in the direction of attachment, as viewed in the longitudinal direction.

The groove 26 is configured in such a manner that the further upstream in the direction of attachment, the wider the width of the groove. Specifically, the groove 26 includes a fitting portion 26A and a guiding portion 26B. The protrusion 51 of the fixing device 8 is fitted in the fitting portion 26A. The guiding portion 26B guides the protrusion to the fitting portion 26A. The guiding portion 26B is configured in such a manner that the further upstream in the direction of attachment, i.e., the farther from the fitting portion 26A, the wider the width of the guiding portion 26B becomes. A downstream side of the fitting portion 26A in the direction of attachment is closed. The width of the fitting portion 26A is approximately the same as a diameter of the protrusion 51.

Figure 11:
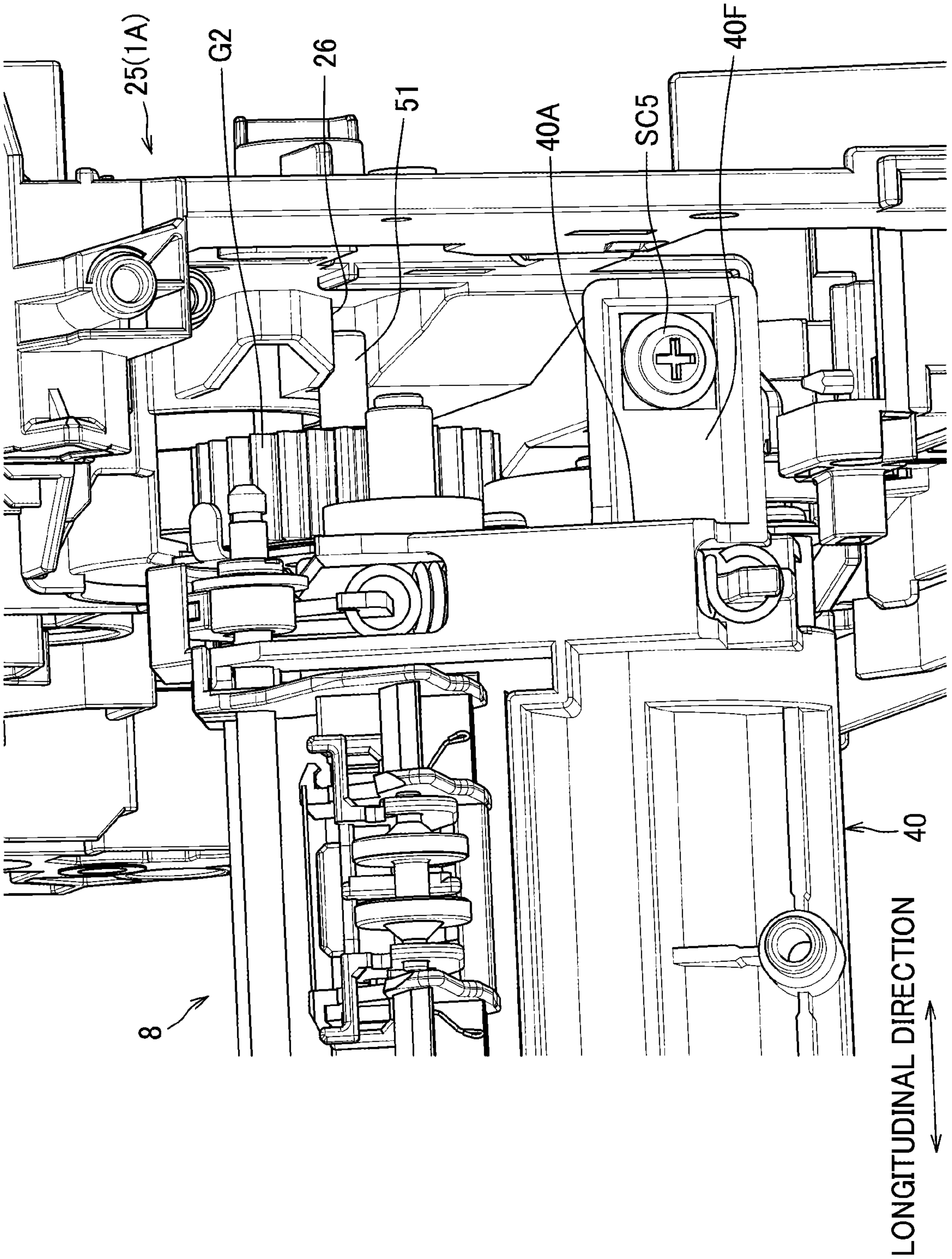
FIG. 11 is a perspective view showing structures in the vicinity of an end of the fixing device attached to the image forming apparatus main body.

As shown in FIG. 11, the first end of the fixing device 8 is fixed to the side frame 25 (image forming apparatus main body 1A) by a screw SC5 with the protrusion 51 fitted in the groove 26. Specifically, the frame 40 includes a plate-shaped fixing portion 40F extending outward from the first side wall 40A in the longitudinal direction (the direction in which the protrusion 51 protrudes). The fixing portion 8 is fixed to the image forming apparatus main body 1A by inserting a screw SC5 through a hole 40G (see FIG. 5A) formed in the fixing portion 40F and fastening the screw SC5 to the side frame 25.

Figure 12A:
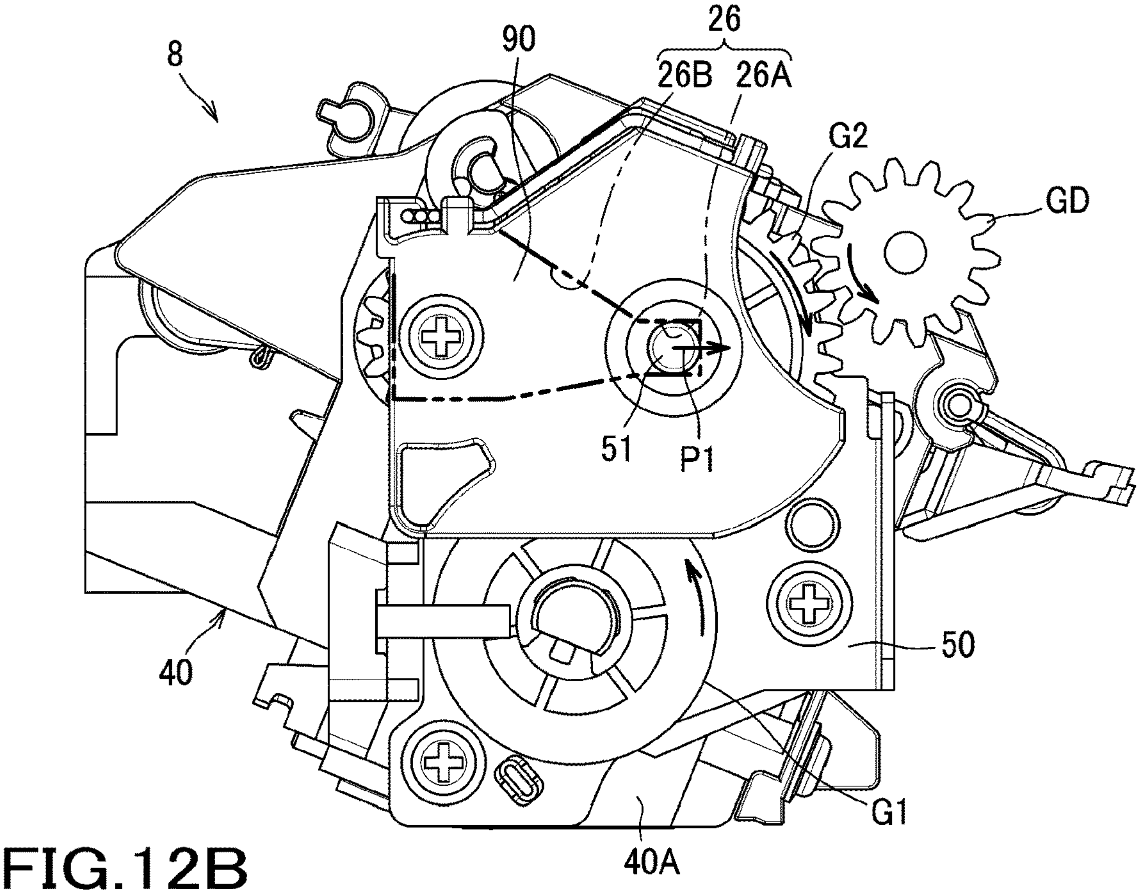
FIG. 12A is a side view showing the fixing device in which a protrusion is fitted in the groove of the image forming apparatus main body and the second gear is meshed with a driving gear.

As shown in FIG. 12A, the driving gear GD is meshed with the second gear G2 of the fixing device 8 when the fixing device 8 is attached to the image forming apparatus main body 1A. A driving force is input to the driving gear GD from a motor (not shown) provided in the image forming apparatus main body 1A.

Figure 12B:
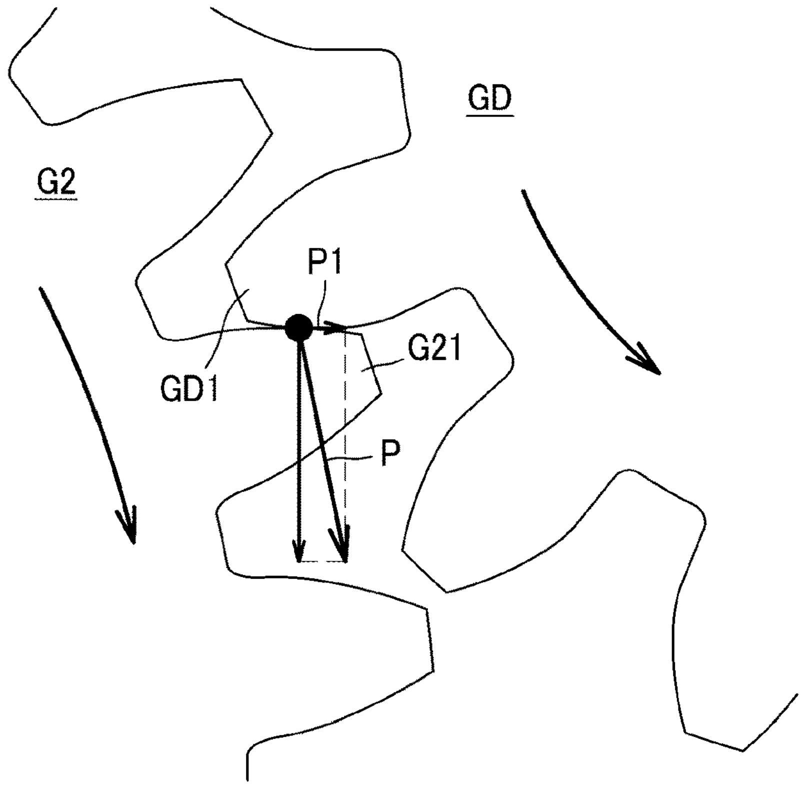
FIG. 12B is an illustration for describing a force applied from the driving gear to the second gear.

The driving gear GD rotates in such a manner as to bias the protrusion 51 supporting the second gear G2 toward the downstream side of the groove 26 in the direction of attachment. Specifically, as shown in FIGS. 12A and 12B, the driving gear GD rotates in such a manner that a force P of a gear tooth GD1 of the driving gear GD pushing a gear tooth G21 of the second gear G2 includes a horizontal component P1 that biases the protrusion 51 toward the downstream side of the groove 26 in the direction of attachment (a closed side of the fitting portion 26A). In the present example, the driving gear GD rotates in the counterclockwise direction of FIG. 12.

According to the fixing device 8 as described above, since the fixing device 8 is located in place with respect to the image forming apparatus main body 1A by a protrusion 51 of the metal reinforcement plate 50 fixed to the first side wall 40A of the frame 40 of the fixing device 8, the fixing device 8 can be accurately located in place with respect to the image forming apparatus main body 1A even if a temperature of the plastic frame 40 rises to a higher temperature. Further, the plastic frame 40 which is likely to rise in temperature can be reinforced by the metal reinforcement plate 50.

Since the protrusion 51 supports the second gear G2 in a manner that allows the second gear G2 to rotate, the protrusion 51 can provide both functions of locating the fixing device 8 in place and supporting the second gear G2 in a manner that allows the second gear G2 to rotate. Thus, it is possible to accurately locate the fixing device 8 in place with respect to the image forming apparatus main body 1A, and increase stiffness of a supporting shaft of the second gear G2. Specifically, the stiffness of the supporting shaft of the second gear G2 can be increased compared to when the supporting shaft is provided on the plastic frame 40. Further, the fixing device 8 can be made more compact in size compared to when the supporting shaft of the second gear G2 is provided apart from the protrusion 51.

Since the second gear G2 and the first gear G1 are directly meshed, the fixing device 8 can be made more compact in size compared to when another gear is provided between the first gear G1 and the second gear G2.

Since the reinforcement plate 50 and the first gear G1 do not contact each other, abrasion and contact noise can be reduced.

Since the protrusion 51 is located at the position inside the outline of the belt BL as viewed in the longitudinal direction, the fixing device 8 can be made more compact in size compared to when the protrusion is located at a position outside the outline of the belt BL as viewed in the longitudinal direction.

Since the reinforcement plate 50 extends over the first wall 41 and the second wall 42 of the first side wall 40A and is fixed to the first wall 41 and the second wall 42, the portion of the first side wall 40A having a lower strength due to the recess 44 can be effectively reinforced by the metal reinforcement plate 50.

Since the pressure arm 60 is engaged with the first boss 45 of the frame 40 and rotatably supported by the frame 40, the first boss 45 can provide both functions of providing a fixing portion for the reinforcement plate 50 and supporting the pressure arm 60 in a rotatable manner. Thus, the fixing device 8 can be made more compact in size compared to when a portion for supporting the pressure arm 60 in a rotatable manner is provided apart from the first boss 45.

Since it is possible to bias the protrusion 51 toward the closed end of the groove 26 when the driving gear GD rotates, according to the above-described image forming apparatus 1, the protrusion 51 can be restrained from falling out of the groove 26; thus the fixing device 8 can be surely located in place with respect to the image forming apparatus main body 1A.

Since the groove 26 is configured in such a manner that the further upstream in the direction of attachment, the wider the width of the groove 26, the protrusion 51 can be easily fitted in the groove 26 when the fixing device 8 is attached to the image forming apparatus main body 1A.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the heater 10 is a ceramic heater in the above-described example, the heater may be, for example, a halogen heater, a carbon heater, an IH heater, or other kind of heater. Although the heating rotating body is an endless belt BL in the above-described example, the heating rotating body may be, for example, a so-called heating roller or the like. Although the pressure rotating body is a pressure roller 82 in the above-described example, the pressure rotating body may, for example, be a pressure unit or the like comprising an endless belt and a pad sandwiching the belt in cooperation with the heating rotating body.

Although the frame 40 is configured to support the belt BL, i.e., the heating rotating body, in such a manner as to allow the belt BL to move in directions parallel to the movement direction in the above-described example, the frame may support, for example, the pressure rotating body in such a manner as to allow the pressure rotating body to move in directions parallel to the movement direction. In this case, the pressure arm may be configured to press the pressure rotating body against the heating rotating body. Further, the pressure arm may be configured, for example, not to include the cam follower 63B of the above-described example.

Although the first gear G1 is attached to the one end of the pressure roller 82, i.e., the pressure rotating body, in the longitudinal direction (the direction in which the protrusion 51 protrudes), in the above-described example, the first gear may be attached, for example, to one end of a heating roller, as another example of the heating rotating body, in the longitudinal direction, i.e., the direction in which the protrusion 51 protrudes.

Although the second gear G2 is directly meshed with the first gear G1 to transmit a driving force to the first gear G1 in the above-described example, the second gear may, for example, be configured to transmit a driving force to the first gear via one or more gears.

Although the reinforcement plate 50 and the first gear G1 are disposed in such a manner that a space GP1, GP2 is provided therebetween, the reinforcement plate and the first gear may be disposed in contact with each other if abrasion and contact noise can be reduced, for example, by a method other than providing a space(s).

Although the protrusion 51 has the functions of locating the fixing device 8 in place and supporting the second gear G2 in a rotatable manner, the protrusion may not be used as a supporting shaft for supporting the second gear in a rotatable manner. Although the reinforcement plate 50 comprises a plate main body 50A, and a metal rod 50B forming the protrusion 51 and fixed to the plate main body 50A by staking, the reinforcement plate 50 may, for example, be configured such that the plate main body 50A and the protrusion 51 of the above-described example are integrally formed in one piece from a single metal sheet.

Although a monochrome printer is given as an example of the image forming apparatus 1, the image forming apparatus may be a multicolor printer. Further, the image forming apparatus may, for example, be a copying machine, a multifunction machine, etc.

The elements described in the above example embodiment and its modified examples may be implemented selectively and in combination.

What is claimed is:

1. A fixing device to be attached to an image forming apparatus comprising a side frame, the fixing device comprising:
- a heater;
- a heating rotating body to be heated by the heater;
- a pressure rotating body configured to form a nip in combination with the heating rotating body;
- a frame made of plastic and configured to support the heating rotating body and the pressure rotating body, the frame having a first end and a second end located apart from each other in a longitudinal direction of the pressure rotating body, the frame including a side wall located at the first end thereof;
- a reinforcement plate made of metal and fixed to the side wall,
- a first gear arranged outside of the reinforcement plate in the longitudinal direction, the first gear being attached to one end of the heating rotating body or the pressure rotating body in the longitudinal direction, and
- a second gear arranged outside of the reinforcement plate in the longitudinal direction, the second gear being configured to transmit a driving force to the first gear,
- wherein the reinforcement plate includes a metal rod that protrudes in the longitudinal direction and supports the second gear in a manner that allows the second gear to rotate, the metal rod including a portion protruding outward of the second gear, and
- wherein the portion of the metal rod protruding outward of the second gear engages a groove formed in the side frame of the image forming apparatus to locate the fixing device in place with respect to the image forming apparatus.

2. The fixing device according to claim 1, wherein the second gear is meshed with the first gear.

3. The fixing device according to claim 1, wherein the reinforcement plate and the first gear are disposed with a space provided therebetween in the longitudinal direction.

4. The fixing device according to claim 1,
wherein the heating rotating body is an endless belt configured to rotate around the heater, and
wherein the pressure rotating body is a pressure roller, with the first gear being attached to the one end of the pressure roller.

5. The fixing device according to claim 1, wherein the metal rod is located at a position inside an outline of the heating rotating body as viewed in the longitudinal direction.

6. The fixing device according to claim 1,
wherein the side wall includes:
a first wall extending in a movement direction perpendicular to the longitudinal direction;
a second wall extending in the movement direction, the second wall being configured to support the heating rotating body or the pressure rotating body in cooperation with the first wall to allow the heating rotating body or the pressure rotating body to move in the movement direction; and
a third wall configured to connect one end of the first wall in a direction parallel to the movement direction and one end of the second wall in the direction parallel to the movement direction, with a recess formed by the first wall, the second wall, and the third wall,
wherein the recess opens in a direction opposite to the direction parallel to the movement direction, and
wherein the reinforcement plate is disposed to extend over the first wall and the second wall, and is fixed to the first wall and to the second wall.

7. The fixing device according to claim 1, wherein the reinforcement plate further includes
a plate body fixed to the side wall, and
wherein the metal rod is fixed to the plate body by staking.

8. The fixing device according to claim 1, comprising a gear cover attached to the side wall, the gear cover being configured to partially cover outer sides of the first gear and the second gear facing in the longitudinal direction.

9. An image forming apparatus, comprising
an image forming apparatus main body; and
the fixing device according to claim 1, the fixing device being installed into the image forming apparatus main body in a predetermined direction of attachment and attached to the image forming apparatus main body,
wherein the image forming apparatus main body comprises the side frame, the side frame facing the first end of the fixing device attached to the image forming apparatus main body, and
wherein the groove extends along the direction of attachment, with an upstream end of the groove in the direction of attachment being open and a downstream end of the groove in the direction of attachment being closed.

10. The image forming apparatus according to claim 9, wherein the image forming apparatus main body comprises a driving gear meshed with the second gear, the driving gear being configured to rotate to bias the metal rod supporting the second gear toward a downstream side of the groove in the direction of attachment.

11. The image forming apparatus according to claim 9, wherein the groove is configured in such a manner that the further upstream in the direction of attachment, the wider the width of the groove.

12. A fixing device to be attached to an image forming apparatus, comprising:
a heater:
a heating rotating body to be heated by the heater;
a pressure rotating body configured to form a nip in combination with the heating rotating body;
a frame made of plastic and configured to support the heating rotating body and the pressure rotating body, the frame having a first end and a second end located apart from each other in a longitudinal direction of the pressure rotating body, the frame including a side wall located at the first end thereof;
a reinforcement plate made of metal and fixed to the side wall; and
a pressure arm configured to press one of the heating rotating body and the pressure rotating body against the other of the heating rotating body and the pressure rotating body,
wherein the reinforcement plate includes a protrusion that protrudes in the longitudinal direction, the protrusion being configured to locate the fixing device in place with respect to the image forming apparatus,
wherein the frame includes a boss extending in the longitudinal direction, the boss having a hole for fixing the reinforcement plate to the frame by a screw, and
wherein the pressure arm is engaged with the boss and rotatably supported by the frame.

* * * * *